United States Patent [19]
Middleton

[11] Patent Number: 5,916,336
[45] Date of Patent: Jun. 29, 1999

[54] METHOD AND APPARATUS FOR CLEANING ABSORBENT MATERIALS

[76] Inventor: Richard G Middleton, 801 Brookwood Dr., Columbia, S.C. 29201

[21] Appl. No.: 09/071,649

[22] Filed: May 1, 1998

Related U.S. Application Data

[63] Continuation of application No. 08/694,619, Aug. 13, 1996.

[51] Int. Cl.[6] .................................................... D06B 9/00
[52] U.S. Cl. ................................ 8/159; 68/18 C; 68/18 R
[58] Field of Search ................................ 68/12.02, 18 C, 68/18 R; 8/142, 158, 159

[56] References Cited

U.S. PATENT DOCUMENTS

| | | |
|---|---|---|
| 3,566,892 | 3/1971 | Logue et al. . |
| 3,595,037 | 7/1971 | Pompei .................................. 68/18 C |
| 3,600,911 | 8/1971 | McLagan ............................... 68/18 C |
| 4,314,856 | 2/1982 | Steimel . |
| 5,172,572 | 12/1992 | Ono ...................................... 68/12.02 |
| 5,222,267 | 6/1993 | Fierro ...................................... 8/158 |
| 5,244,566 | 9/1993 | Bond . |
| 5,250,197 | 10/1993 | Marcel . |
| 5,309,587 | 5/1994 | Fierro ...................................... 8/158 |

FOREIGN PATENT DOCUMENTS 2-277498  11/1990  Japan ................................... 68/12.02

OTHER PUBLICATIONS

WO 91/07537 68/12/02, May 1991.

*Primary Examiner*—Frankie L. Stinson
*Attorney, Agent, or Firm*—Michael A Mann; Nexsen Pruet Jacobs & Pollard LLP

[57] ABSTRACT

A method and system for removing a lubricant from an absorbent material. The method comprises placing the lubricant-contaminated material in a dry cleaner and centrifuging the material to remove and subsequently recover a first quantity of lubricant, dry cleaning the material, separating and recovering a second quantity of lubricant from the dry cleaning fluid, and recycling the dry cleaning fluid. The present invention maximizes the recovery of lubricant and effectively recycles the dry cleaning fluid, which in turn minimizes both the cost and environmental impact of cleaning absorbent materials.

20 Claims, 1 Drawing Sheet

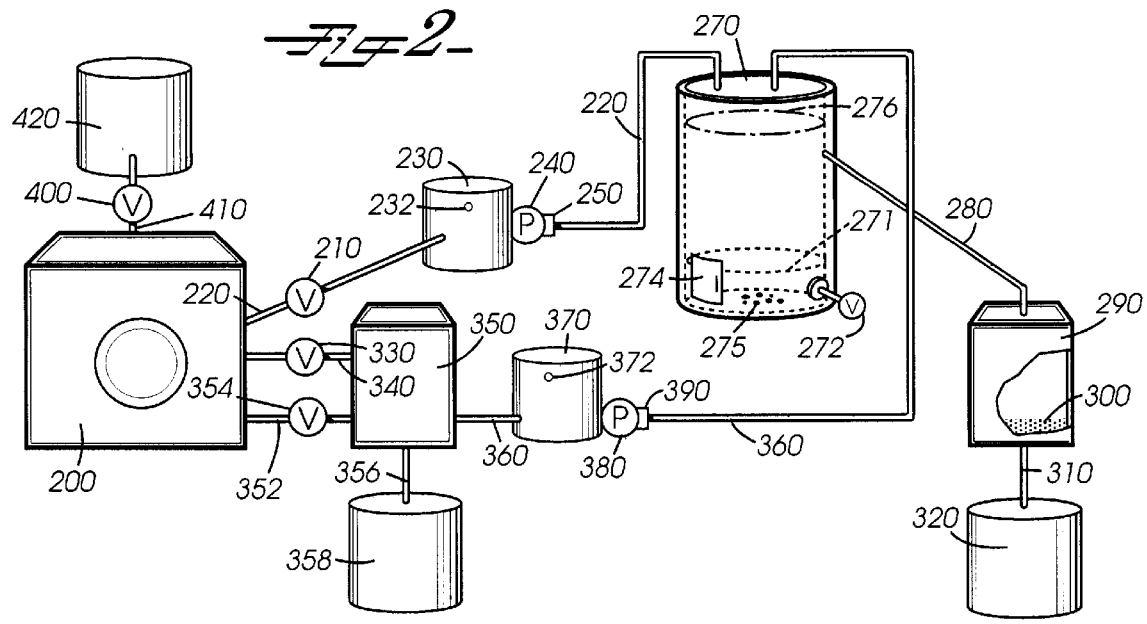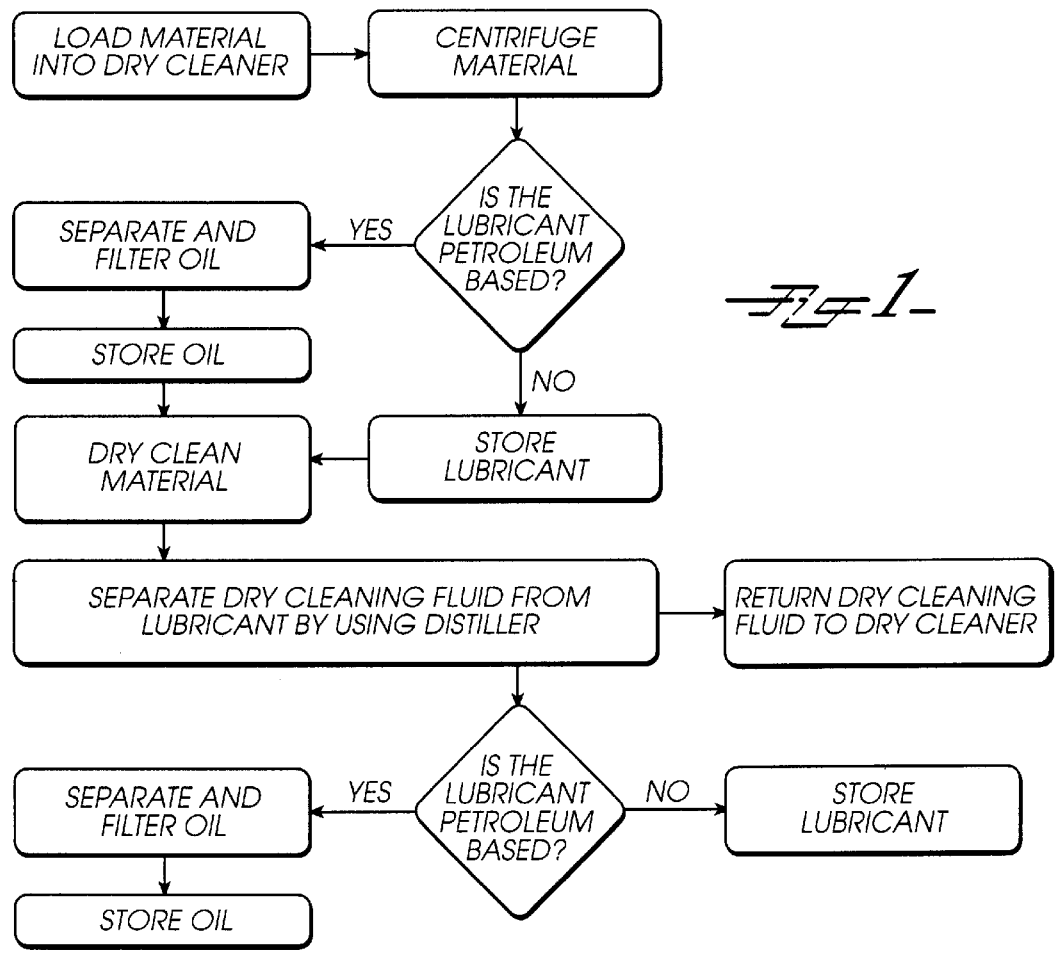

METHOD AND APPARATUS FOR CLEANING ABSORBENT MATERIALS

This application is a continuation of Ser. No. 08/694,619 filed Aug. 13, 1996.

BACKGROUND OF THE INVENTION

1. Field of the Invention

The present invention relates to a method and apparatus for removing oil from oil-absorbent pads or socks so that they can be reused and the oil can be recycled without producing any hazardous waste.

2. Discussion of Background

The desorption of oil and other industrial lubricants from absorbent materials such as pads or "socks" is a prevalent industrial process. As a result, the current art contains a variety of different methods by which oil is removed from a material. What follows is a brief overview of the art's current state.

U.S. Pat. No. 5,298,079 issued to Guymon sets forth a method wherein oil filters are crushed while being simultaneously washed with a surfactant. The crushed oil filters are then reprocessed into steel.

U.S. Pat. No. 5,192,455, issued to Marcel, Jr. and U.S. Pat. No. 5,250,197, issued to Marcel, both disclose a system for removal which includes subjecting the oil-containing material to squeeze rollers, a solvent shower, and a centrifuge. Thereafter the material is dried to restore it to a reusable condition.

U.S. Pat. No. 5,244,566 issued to Bond, teaches a special emulsion of citric oil-in-water that causes the waste oil to separate into three layers: an oil layer, an emulsion layer and a waste layer.

U.S. Pat. No. 4,314,856 issued to Steimel sets forth a process where an object is degreased, washed and dried in one location. This is accomplished by tilting the axis of rotation of a centrifuge and by operating the centrifuge at different speeds.

U.S. Pat. No. 3,566,892 issued to Logue teaches a device for use in cleaning oil filters. The device contains means by which various-sized filters may be cleansed.

However, there remains a need for an oil removal process that is simple, effective and that allows the recovery of the oil as well as the restoration of the material to a usable state.

SUMMARY OF THE INVENTION

According to its major aspects and briefly stated, the present invention is a method and system for removing oil and other lubricants from absorbent materials so that the materials can be reused to absorb oils and the recovered oil can be recycled. The system comprises a closed loop dry cleaning machine connected to an industrial distiller, a source of dry cleaning fluid, a separation tank for receiving petroleum-based lubricants, and a container for receiving waste lubricants that are not petroleum-based. The absorbent materials are loaded into the dry cleaning machine where they are first centrifuged to remove excess lubricants. If the lubricants are non-petroleum based, they are directed to the container specifically designated for those types of lubricants. If they are petroleum-based, they are directed to the tank. A valve system controls the direction of flow, and each stream is pumped through a filter that removes particulates before the waste lubricants reach their respective containers.

The materials are then dry cleaned using perchloroethylene, as usual, except that the dry cleaning machine has no filter or distiller. Instead, the dirty perchloroethylene is routed to the industrial distiller where it is distilled separately. The distilled perchloroethylene is then returned to the dry cleaning machine for reuse. The oil separated by the industrial distiller is pumped through a filter to the separation tank.

At the separation tank, when the lubricant level rises above an outlet, the recovered lubricants flow by gravity through a bag filter to remove suspended particulates and on to a final oil storage tank where the cleaned oil will be sold to approved oil refineries.

A major feature of the present invention is the use of a dry cleaning apparatus to centrifugally remove a quantity of lubricants. Using a dry cleaner to centrifuge the absorbent materials eliminates the need for a separate centrifuge device, which in turn reduces machinery, as well as operational costs.

Another advantage gained by using a dry cleaner to centrifuge the material is that the absorbent materials do not have to be moved from the dry cleaning machine until the conclusion of the cleaning process. They are put into the dry cleaning machine dirty and removed clean. This reduces both labor and transportation costs.

The use of the filters in combination with both the distiller and separation tank is another very important feature of the present invention. Because of this combination, the present process produces no hazardous waste. Additionally, the dry cleaning fluid is completely recycled, thereby reducing the cost of operations. Moreover, the recovered oil is substantially free of both particulate matter and fluids, which in turn increases its economic value.

The use of an industrial distiller rather than a typical dry cleaning machine distiller is another important feature of the present invention. Because both the internal temperature and pressure can be precisely controlled, the independent distiller allows a more effective separation of the perchloroethylene from the lubricants. This is turn maximizes the purity of the recycled perchloroethylene and increases the recovery of lubricants.

Other features and advantages of the present invention will be apparent to those skilled in the art from a careful reading of the Detailed Description of a Preferred Embodiment presented below.

BRIEF DESCRIPTION OF THE DRAWINGS

In the drawings,

FIG. 1 is a flow chart of a method for removing a lubricant from a material according to a preferred embodiment of the present invention; and FIG. 2 is a perspective view of a system for removing a lubricant from a material according to the method of FIG. 1, with the fluids within the interior of the separation tank illustrated in ghost and a partial cutaway of a filter container.

DETAILED DESCRIPTION OF A PREFERRED EMBODIMENT

Referring now to FIGS. 1 and 2, there is shown a flow chart of a method for removing a lubricant from an absorbent material according to a preferred embodiment of the present invention and a system for accomplishing the method described in FIG. 1, respectively. It is recognized that although the method and system of the present invention is described as removing a lubricant from an absorbent material, the present invention may be utilized to remove any fluid from an absorbent material. The first step in this process is to determine whether the material to be cleaned is contaminated with petroleum-based lubricants or non-petroleum-based lubricants. This determination is routinely made by an artisan with ordinary skill in the art without having to engage in undue experimentation.

The contaminated material is then loaded into a dry cleaner 200. Dry cleaner 200 may be any industrial size dry cleaner capable of rotating at a speed between approximately 450 and 800 revolutions per minute. Depending upon the dry cleaner used, it may be necessary to replace the internal motor with another motor having greater horsepower, so that a speed of between 450 and 800 revolutions per minute can be achieved. In addition, prior to initiating the process as described in detail below, it is first necessary to remove both the dry cleaner's internal filter and distiller. This removal procedure, as well as the replacement of the internal motor, is accomplished by the manufacturer of the dry cleaning apparatus. An example of an industrial dry cleaner capable of use with the present invention is a Victory-E series dry cleaning system, manufactured by Victory Dry Cleaning Systems of East Point, Ga.

Once loaded, the material is centrifuged until approximately between 98% and 99.5% of the lubricant has been extracted from the material. The next process step depends upon the type of lubricant being removed. If the lubricant is petroleum-based, valve 210 is opened and the oil lubricant stream exits dry cleaner 200 via piping 220 and is forwarded to tank 230. The purpose of tank 230 is to allow an operator to remove, via aperture 232, samples of the fluid contained therein for analysis. Tank 230 is equipped with a pump 240 having a filter 250 attached thereto. As pump 240 draws oil from tank 230, filter 250 removes particles from the oil stream. Upon leaving filter 250, the oil stream exits piping 220 and is received by a separation tank 270.

While residing in separation tank 270, gravitational forces affect the separation of any liquid or solid contaminants, such as water 271 or dirt 275, still suspended within oil 276. These solid and liquid contaminants settle to the bottom of tank 270, while the oil rises to the top of tank 270.

Separation tank 270 is equipped with a pipe 280, located within the upper region of tank 270 and in fluid communication with its interior. When oil 276 within tank 270 reaches a certain level, it enters pipe 280 and flows, by gravity, into a container 290 having a filter 300 located therein. Preferably, filter 300 is sized to capture solids having a particle size greater than or equal to approximately 200 microns. Subsequent to filtration by filter 300, the oil exits container 290 via piping 310 and is forwarded by gravity into oil storage tank 320, where it is recovered and awaits further processing. Once the oil has been removed from separation tank 270, a valve 272 positioned in the bottom region of separation tank 270 is opened to allow the water to drain therefrom. Solid matter may be removed from the bottom of tank 270 through an access door 274.

After the material residing within dry cleaner 200 has been centrifuged, valve 210 is closed and a charge of dry cleaning fluid is introduced to the interior of dry cleaner 200. The dry cleaning fluid normally utilized in cleaning contaminated industrial material is perchloroethylene (hereinafter "PCE"). Although the present process is described using PCE, it is recognized that any dry cleaning fluid normally employed in the art may be used without departing from the spirit and scope of the present invention.

Once the charge of PCE has been added to dry cleaner 200, the material is dry cleaned in accordance with normal industry procedure. Afterwards, the material is removed from dry cleaner 200 and the interior of dry cleaner 200 is wiped with a cloth to remove any residual PCE or oil. A valve 330 is then opened, allowing a mixture of oil and PCE to flow through piping 340 and into distiller 350. Distiller 350 may be any industrial distiller or boiler commonly employed in the art capable of separating a lubricant from a dry cleaning fluid. When dry cleaning a petroleum-based lubricant using PCE, distiller 350 must be able to achieve a temperature of approximately 265° F. to affect the phase separation. It is understood that the temperature at which separation occurs will vary as a function of both the dry cleaning fluid used and the type of lubricant removed, and therefore an artisan with ordinary skill would alter the temperature of distiller 350 accordingly. An example of a distiller capable of use with the present invention is sold under the trademark SIVA.

Once distillation is complete, valve 354 is opened and the purified PCE exits distiller 350 and is recycled via piping 352 into dry cleaner 200. Such purified PCE may be used again to dry clean contaminated materials.

The separated oil exits distiller 350 via piping 360 and enters tank 370. Tank 370 is equipped with a pump 380 having a filter 390 attached thereto. The purpose of tank 370 is to allow an operator to remove, via aperture 372, samples of the fluid contained therein for analysis. As pump 380 draws oil from tank 370, filter 390 removes particulate matter from the oil stream. Upon leaving filter 390, the oil stream exits via piping 360 and is received by a separation tank 270. Once received by separation tank 270, the oil is processed in the same manner as detailed above.

In the alternative, if the lubricants to be removed are non-petroleum based, then the pads are centrifuged within dry cleaner 200 as detailed above. After centrifuging, valve 400 is opened and the contaminants collected during centrifuge are forwarded via pipe 410 into a drum 420. Valve 400 is then closed while a suitable dry cleaning fluid is introduced to the interior of dry cleaner 200. The pads are then dry cleaned and subsequently removed from dry cleaner 200. Valve 330 is then opened to forward a mixture of lubricant and dry cleaning fluid into distiller 350. The fluid is then distilled to separate the dry cleaning fluid from the lubricant. Once distilled, the lubricant travels through pipe 356 into a storage container 358 while the distilled dry cleaning fluid is reintroduced to dry cleaner 200.

It will be apparent to those skilled in the art that many changes and substitutions can be made to the preferred embodiment herein described without departing from the spirit and scope of the present invention as defined by the appended claims.

What is claimed is:

1. A method for removing lubricant from a material, said method comprising the steps of:

determining whether a lubricant is petroleum-based or not petroleum based;

centrifuging said material to separate a quantity of said lubricant and impurities from said material;

if said lubricant is petroleum-based lubricant, forwarding said separated lubricant and impurities to a tank having means for removing petroleum-based lubricant from said impurities;

allowing said petroleum-based lubricant to separate from said impurities in said tank, said petroleum-based lubricant rising to the top of said tank as it separates;

dry cleaning said material;

distilling said dry cleaning solution to separate said dry-cleaning solution from said lubricant;

if said lubricant separated by distilling is petroleum-based, forwarding said petroleum-based lubricant from said dry cleaning machine to said tank; and skimming petroleum-based lubricant from said tank.

2. The method as recited in claim 1, wherein said centrifuging is done at a speed of at least 450 RPM.

3. The method as recited in claim 2, wherein said dry cleaning step is done using a solution of perchloroethylene.

4. The method as recited in claim 2, further comprising the step of filtering said petroleum-based lubricant through a 200 micron filter as it is skimmed from said tank.

5. The method as recited in claim 2, wherein said distilling step takes place using an industrial distiller capable of distilling at approximately 265° F.

6. The method as recited in claim 4, wherein said dry cleaning step is done in a dry cleaning machine adapted to pass effluent containing dry cleaning solution and lubricants.

7. The method as recited in claim 4, further comprising the step of filtering said petroleum-based lubricant through a 200 micron filter as it is skimmed from said tank.

8. The method as recited in claim 1, wherein said dry cleaning step is done in a solution of perchloroethylene.

9. The method as recited in claim 1, wherein said dry cleaning step is done in a dry cleaning machine adapted to pass effluent containing dry cleaning solution and lubricants.

10. The method as recited in claim 9, wherein said drycleaning machine is a commercial dry cleaning machine without a filter and a distiller.

11. The method as recited in claim 1, further comprising the step of filtering said petroleum-based lubricant through a 200 micron filter as it is skimmed from said tank.

12. The method as recited in claim 1, further comprising the step of forwarding non-petroleum-based lubricants following centrifuging to a storage container.

13. The method as recited in claim 1, wherein said distilling step takes place using an industrial distiller capable of distilling at approximately 265° F.

14. A method for removing lubricant from a material, said method comprising the steps of:

centrifuging said material to separate a quantity of a lubricant and impurities from said material;

forwarding said separated lubricant and impurities to a tank having means for removing said lubricant from said impurities;

dry cleaning said material;

distilling said dry cleaning solution to separate said dry-cleaning solution from said lubricant;

forwarding said lubricant from said dry cleaning machine to said tank;

allowing said lubricant to rise to the top of said tank as said impurities settle to the bottom of said tank;

skimming lubricant from said tank; and filtering said skimmed lubricant through a filter.

15. The method as recited in claim 14, wherein said centrifuging is done at a speed sufficient to remove at least 98% of said lubricant from said material.

16. The method as recited in claim 15, wherein said distilling is done in an industrial distiller capable of distilling at a temperature of approximately 265° F.

17. The method as recited in claim 15, wherein said dry cleaning is done in a commerical dry cleaning machine having no effluent filter.

18. The method as recited in claim 14, wherein said distilling is done in an industrial distiller capable of distilling at a temperature of approximately 265° F.

19. The method as recited in claim 14, wherein said dry cleaning is done in a commercial dry cleaning machine having no effluent filter.

20. The method as recited in claim 16, wherein said filter is a 200 micron filter.

* * * * *